United States Patent [19]

Salathiel et al.

[11] 4,136,739
[45] Jan. 30, 1979

[54] METHOD FOR GENERATING HYDROFLUORIC ACID IN A SUBTERRANEAN FORMATION

[75] Inventors: William M. Salathiel; Christopher M. Shaughnessy, both of Houston, Tex.

[73] Assignee: Exxon Production Research Company, Houston, Tex.

[21] Appl. No.: 826,206

[22] Filed: Aug. 19, 1977

[51] Int. Cl.$^2$ ............................................. E21B 43/27
[52] U.S. Cl. ..................................... 166/300; 166/307
[58] Field of Search ............... 166/252, 259, 270, 271, 166/273, 281, 300, 307; 252/8.55 C

[56] References Cited

U.S. PATENT DOCUMENTS

| | | | |
|---|---|---|---|
| 1,990,969 | 2/1935 | Wilson | 166/300 |
| 2,038,720 | 4/1936 | Groote | 166/307 |
| 2,872,982 | 2/1959 | Wade | 166/300 |
| 3,481,404 | 12/1969 | Gidley | 166/307 |
| 3,679,000 | 7/1972 | Kaufman | 166/273 |
| 3,889,753 | 7/1975 | Richardson | 166/300 X |
| 3,931,089 | 1/1976 | Karl | 252/8.55 C X |
| 4,056,146 | 11/1977 | Hall | 166/300 |

Primary Examiner—Stephen J. Novosad
Assistant Examiner—George A. Suchfield
Attorney, Agent, or Firm—Gary D. Lawson; Robert L. Graham

[57] ABSTRACT

A method is disclosed for generating or forming hydrofluoric acid in a subterranean siliceous formation by combining an injected aqueous solution of a fluoride salt and an injected aqueous acid solution in the pore spaces of the formation. This is accomplished according to this invention by immobilizing one of the aqueous solutions in the pore spaces of the formation by displacing the aqueous solution into the formation with a liquid that is substantially immiscible with the injected aqueous solution, thereby driving said aqueous solution to a saturation at or below its residual saturation. The other aqueous solution is then injected into the formation.

37 Claims, 6 Drawing Figures

METHOD FOR GENERATING HYDROFLUORIC ACID IN A SUBTERRANEAN FORMATION

BACKGROUND OF THE INVENTION

1. Field of the Invention

The present invention relates to the treatment of subterranean formations penetrated by wellbores, and relates more particularly to methods for treatment of subterranean siliceous formations with acid.

2. Prior Art

Often the cause of low productivity of oil and gas in subterranean sandstone formations is reduced formation permeability near the wellbore. This condition, called "formation damage" has been related to a variety of completion and drilling practices. For example, the perforating of casing may reduce permeability around the perforation by matrix crushing and compaction caused by the shaped charge or by gun debris. The loss of completion fluids, filtrates from drilling mud, or drilling mud particles may cause clay swelling, particle plugging by dispersed formation fines, particle invasion, or adverse change in fluid saturation.

Many of the adverse permeability effects relate directly to the clay fraction of the matrix. It is well known that certain effects such as clay swelling, clay dispersion, and particle plugging can be reduced by solubilizing the clay with mineral acid solutions of hydrogen fluoride. Commonly, aqueous solutions containing from about 2 to 6 weight percent hydrofluoric acid and from 5 to 15 weight percent hydrochloric acid (generally called "Mud Acid") are employed to treat the damage formations. The low pH conditions provided by the hydrochloric acid is beneficial in solubilizing the products formed by the reaction between hydrofluoric and the formation material. This HF-HCl treating solution reacts most rapidly with calcite, rapidly with clay, less rapidly with other silicates, and slowest with the silica of natural sands. The precise rates of these reactions are largely controlled by the concentration of hydrofluoric acid in the treating solution. The higher the hydrofluoric acid concentration the more rapid the reaction rate.

Because the reaction of hydrofluoric acid on silica and clay is generally rapid at formation temperatures (120–220° F.), a majority of the acid solution becomes spent within a radius of about 24 inches from the wellbore and a lesser amount of active acid solution penetrates beyond this distance. Moreover, because the majority of the reaction occurs within a small volume of the formation matrix, the concentration of reaction products (some of which may precipitate) and fines liberated by the reaction may cause permeability impairment if the hydrofluoric acid concentration is too high.

Because the materials plugging the porous formation of rock are only removed for a short distance around the well, invasion of the treated region by new fine particles can occur after a short period of time. These fine particles are believed to originate deeper in the formation and are carried toward the wellbore by the flowing fluid during production. A method for achieving deeper acid penetration would remove these particles to a greater radius from the wellbore, thereby lengthening the time required for fines to migrate back to the well.

Localized spending of hydrofluoric acid near the wellbore may also result in increased water production. Hydrofluoric acid injected into the wellbore reacts readily at the interface between the formation rock and the cement used to set the wellbore casing. A channel may be formed along this interface which can allow water from the nearby strata to reach the producing well. Elimination of this problem requires that the concentration of hydrofluoric acid in solution be low as fluids are injected into the formation past the formation-cement interface.

A plastic consolidation of incompetent sands is strongly effected by the quality of any preceding acid treatment. The compressive strength of a plastic consolidation decreases as the clay content of the sand increase. It is observed that the strength profile of the consolidation parallels the clay removal profile by the acid. To have high consolidation strengths over the formation volume to be consolidated, clay should be thoroughly and evenly removed from that volume.

Numerous procedures have been suggested to obtain substantial penetration of hydrofluoric acid into the formation. One method comprises contacting an oil-containing sandstone formation with a surface-active compound to render the surfaces of the formation sands oil-wet, thereby imparting hydrophobic properties to the formation. As a result of the formation having hydrophobic properties, the reaction rate of hydrofluoric acid within the formation is retarded, thereby enhancing acid penetration into the formation.

Another method, as described in U.S. Pat. No. 3,828,854, issued to Templeton et al on Aug. 13, 1974, generates hydrofluoric acid in situ. In this method, an aqueous solution of a water soluble fluoride salt is mixed with a relatively slowly-reactive acid-yielding material that subsequently converts the fluoride salt solution to a hydrofluoric acid solution that has a relatively high pH (at least about 2), but is capable of dissolving siliceous materials. In the preferred embodiment, the fluoride salt is an ammonium salt of hydrofluoric acid and the acid-yielding material is a formic acid ester. One problem with this method is that the formic acid formed from the ester hydrolysis is a weak acid so that the pH of the treating solution formed is relatively high. In this relatively high pH solution, the hydrofluoric acid concentration is relatively low so that the rate and the extent of the reaction with the formation matrix is consequently low. For any fluoride ion concentration, the pH should be reduced to at least about 1 to maximize hydrofluoric acid generation from fluoride ion and to effectively solubilize reaction products. This process is further limited by the solubility of the formic acid ester in ammonium fluoride solutions. The total amount of hydrofluoric acid which can be formed by this process is limited by the amounts of formic acid and ammonium fluoride which can be combined in solution.

Another hydrofluoric acid generation method (as described in SPE Paper No. 6512 entitled "A New Technique for Generating In-Situ Hydrofluoric Acid for Deep Clay Damage Removal" by B. E. Hall, presented at the 47th Annual California Regional Meeting of the SPE on Apr. 13–15, 1977) is multi sequential injection of fluoride ion solution followed by a hydrochloric acid solution. The beneficial effect of this procedure is ascribed to the adsorption of fluoride ions on the anion exchange sites of the clay minerals followed by activation of the adsorbed fluoride ions by a pursuing hydrochloric acid solution. The effectiveness of this process is limited by the anion exchange capacity of the resident clay. Since most clays have a small anion exchange capacity, the amount of hydrogen fluoride produced by this method is also small.

A need still exists for an improved technique for generating hydrofluoric acid in a formation which overcomes the problems associated with rapid spending of the acid solution within a short radial distance from the wellbore.

SUMMARY OF THE INVENTION

In accordance with the present invention, the hydrofluoric acid is formed by combining an aqueous solution of a fluoride salt and an aqueous solution of an acid in the pore spaces of the formation. This is accomplished by immobilizing one of the aqueous solutions, in the pore spaces of the formation by displacing solution with a liquid phase that is substantially immiscible with said aqueous phase, thereby driving said aqueous solution to a saturation at or below its residual saturation. The second aqueous solution is then injected into the formation.

In a preferred embodiment, water containing an ammonium salt of hydrofluoric acid is injected into the formation to be treated. The salt solution is then followed by a hydrocarbon liquid such as diesel oil to reduce the saturation of the salt solution to residual saturation. After the hydrocarbon liquid has been injected, hydrochloric acid solution is injected into the formation. The acid solution contacts the ammonium fluoride salts to form hydrofluoric acid which is capable of dissolving siliceous material in the formation.

Other embodiments of this invention include adding various additives such as viscosifiers, surface active compounds and corrosion inhibitors to the aqueous fluoride-containing solution and/or the injected hydrocarbon liquid and/or the aqueous acid-containing solution. It is particularly preferred in the practice of this invention to inject into the formation an aqueous fluoride-containing solution which also contains a viscosifier such as a salt of poly 2-acrylamido-2-methyl propyl sulfonate and to inject into the formation a hydrocarbon which also contains one or more preferentially oil soluble surface-active compounds such as ethylene glycol monobutyl ether and/or sorbitan monooleate.

It is also particularly preferred in the practice of this invention to follow the aqueous fluoride containing solution with two sequential volumes of diesel oil; the first volume containing surface active compounds and the second volume being substantially free of surface-active compounds.

The practice of this invention provides an improved process for generating hydrofluoric acid in a formation. By this process, hydrofluoric acid is continuously generated at and behind the advancing hydrochloric acid front as it displaces the hydrocarbon liquid which immobilized the fluoride salt solution from the pore spaces. In this way hydrofluoric acid is generated at deeper radial depths into the formation than practicable prior to this invention. This invention substantially alleviates the problems associated with rapid spending of hydrofluoric acid within a short radial distance from the wellbore.

BRIEF DESCRIPTION OF THE DRAWINGS

FIG. 1-A shows the formation oil and water saturations prior to the practice of this invention.

FIG. 1-B shows the formation fluids saturations as an aqueous fluid containing fluoride salts is injected into the formation.

FIG. 1-C shows the formation fluid saturations as a hydrocarbon fluid such as diesel oil is injected into the formation.

FIG. 1-D shows the formation fluid saturations wherein the oil has reduced the saturation of the fluoride-containing fluid to residual saturation.

FIG. 1-E shows the formation fluid saturations as an aqueous solution containing an acid is injected into the formation.

DESCRIPTION OF THE PREFERRED EMBODIMENTS

The present invention is particularly useful for treating a subterranean sandstone formation to improve effective permeability by dissolving siliceous materials. These materials may comprise fine particles of sand, clay, silica or other silicate minerals, as well as intergranular cementing material in the pores of a subterranean formation, or a sand or gravel pack in the borehole of the well.

The present invention is an improved technique for generating hydrogen fluoride in a subterranean sandstone formation. In a preferred embodiment of this invention fluoride ion-containing salt solution is injected into the formation and then immobilized in the pore spaces of the formation by injection of a hydrocarbon liquid. An aqueous solution containing an acid is then injected into this formation to generate hydrofluoric acid. The method effectively produces hydrofluoric acid uniformly over the entire region containing immobile fluoride compounds. Substantial penetration of the formation can therefore be achieved with the active acid solution of hydrochloric and hydrofluoric acids.

Figure 1:
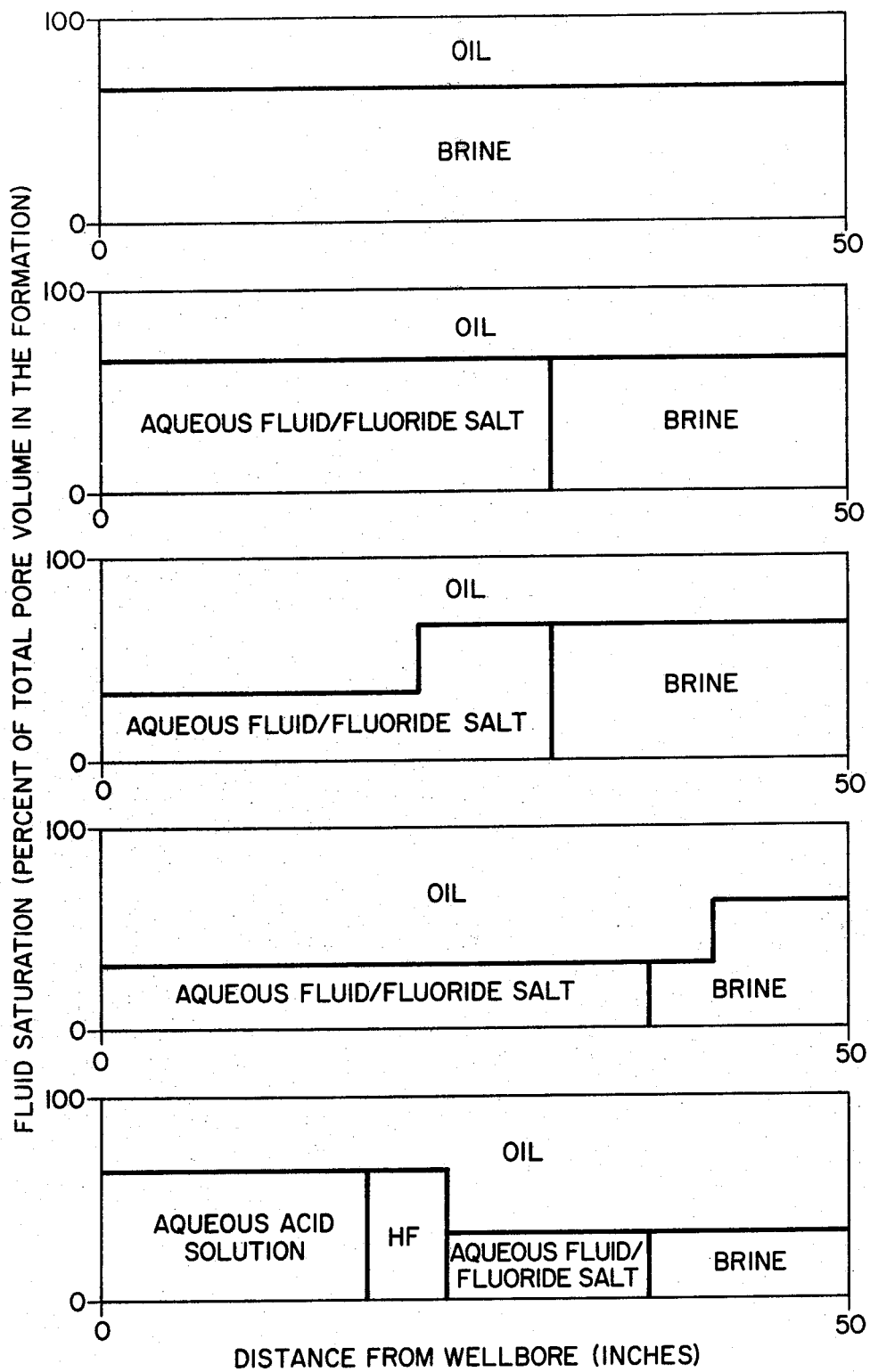
FIGS. 1 A-E are graphic illustrations of a formation showing the percentage saturations of fluids in the formation at various stages in the processes of this invention.

The practice of a preferred embodiment of this invention may be explained more clearly by referring to FIGS. 1A, B, C, D, and E. FIG. 1-A illustrates the oil and brine saturation in the subterranean formation prior to the practice of this invention. In this portion of the formation, the oil saturation is considered to be at residual oil saturation. This condition which will exist after brine is injected into an oil-bearing reservoir. FIGS. 1 B-E show the formation fluid saturations as the formation is being flooded with fluids in accordance with this invention. Advancing fluid fronts are shown by vertical lines, but it is understood that such interfaces are usually irregular and are not well defined.

The first step in this embodiment is to inject into the formation by means of a well an aqueous solution containing a fluoride salt. As shown in FIG. 1-B, the fluoride-containing solution drives the brine away from the wellbore and bypasses the residual oil in the formation pore spaces. After a suitable amount of the aqueous liquid has been injected, a hydrocarbon solution such as diesel oil is injected into the formation. As shown in FIG. 1-C, the injected oil drives the mobile aqueous fluoride-containing solution away from the wellbore leaving an immobile residual saturation of the fluoride-containing solution. If a sufficient amount of oil is injected into the formation, the oil will reduce essentially all the fluoride-containing solution to its residual saturation (as depicted in FIG. 1-D). By definition when the fluoride-containing solution is at or below its residual saturation, it cannot flow (it is immobilized) as oil phase flows through the pore space around it. After a suitable amount of hydrocarbon has been injected, an aqueous solution containing an acid is injected in the formation. The acid solution drives the mobile hydrocarbon away from the wellbore, replaces the displaced oil with aqueous acid and reduces the oil saturation in the formation to its residual saturation. The aqueous fluoride-containing solution is not displaced ahead of the acid solution. Rather, the acid solution mixes with the previously residual fluoride ion-containing solution as it is encountered to continuously form hydrogen fluoride at the advancing acid front. The generation of hydrogen fluoride continues for some distance behind the acid front as fluoride ions diffuse out of the smaller pore spaces and acid diffuses into them. The hydrogen fluoride thus generated can dissolve siliceous materials in the formation. Since the clay minerals react with hydrogen fluoride several orders of magnitude faster than other siliceous materials, clay is preferentially removed.

The aqueous fluid containing fluoride salt is preferably formed from water which is substantially free of metal ions because many metal ions complex or precipitate fluoride ions or reaction products thereof.

The amount of fluoride-containing fluid injected will vary depending on the extent of formation damage, the formation porosity, and the permeability of the formation to flow of aqueous fluoride-containing solution. Generally about 1 barrel to about 20 barrels of liquid are injected per foot of formation interval to be treated.

The water-soluble fluoride salts used in the present invention can comprise one or more of substantially any fluoride salt that is water soluble. Ammonium salts of hydrofluoric acid, i.e. ammonium fluoride or ammonium bifluoride, are preferred fluoride salts for use in the present process. In using ammonium bifluoride ($NH_4HF_2$) it may be desirable to add enough ammonia or ammonium hydroxide to provide substantially equimolar amounts of ammonium and fluoride ions.

The concentration of fluoride salt in the aqueous solution can vary widely depending on the degree of damage to be removed and porosity of the formation. As is well known, the amount of siliceous material that will be dissolved can be increased by increasing the concentration of the hydrofluoric acid. Therefore, it is generally preferred to contact the siliceous material with a strong solution. In many prior art processes, strong HF solutions cause permeability damage due to reaction generated pricipitates and fines. For example, permeability damage frequently occurs when a high HF concentration is injected at the formation face because a majority of the reaction with the formation matrix occurs in the small formation volume near the face. In the present invention permeability damage is alleviated because hydrogen fluoride is generated over the entire region containing fluoride salts so that the concentration of reaction generated precipitates and fines remains low and uniformly distributed.

The liquid injected into the formation after injection of the aqueous liquid-containing fluoride salts may be any liquid which is substantially immiscible with the aqueous fluoride-containing solution and will immiscibly displace aqueous liquids in a porous medium. Examples of suitable liquids include perflurohexane, perflurooctane, cyclohexanone, dioctyl ether, decanol, and hydrocarbons including kerosene, light crude oil, diesel oil, and xylene. For economic reasons, the aqueous immiscible liquid will most frequently be a hydrocarbon. The use of diesel fuel or similar low viscosity petroleum fraction is generally preferred.

The amount of hydrocarbon or other liquid immiscible with the aqueous solution injected into the formation will vary depending on the amount of fluoride-containing solution injected into the formation. Preferably, a sufficient volume of liquid is injected to reduce substantially all of the fluoride-containing solution to residual fluid saturation. Generally the volume of injected hydrocarbon will be about the same as the volume of the injected aqueous solution containing fluoride salts.

In the most preferred embodiment, two hydrocarbon-volumes will be injected sequentially. In this embodiment, the first volume will contain a low molecular weight preferentially oil soluble surface-active agent such as ethylene glycol monobutyl ether and/or a higher molecular weight preferentially oil soluble surface-active agent such as sorbitan monooleate. The second volume will contain no surface active agent. The object of this two-volume sequence is to reduce the fluoride salt containing solution to a saturation substantially below the residual satuation obtainable with the untreated hydrocarbon fluid. This lower saturation will further assure immobilization of the fluoride solution after injection of the untreated hydrocarbon fluid and will minimize the volume of any subsequent mixing zone between fluoride solution and pursuing acid solution. Each hydrocarbon volume may be about the same as the volume of injected aqueous fluoride solution.

Any water soluble acid generally employed in acidizing treatments may be utilized in the practice of this invention. Suitable acids include, for example, halogen acids such as HCl, HI, and HBr; mineral acids such as sulfuric, nitric, and phosphoric; organic acids such as acetic, proponic acid, and formic acid; modified organic acids such as mono-, di-, and trichloroacetic acids; and, various mixtures thereof. Hydrochloric acid (HCl) is generally preferred. The acid solution can contain up to about 38% by weight of these acids.

Viscosity increasing agents may be added to any of the injected fluids in the practice of this invention. Preferably the aqueous fluoride-containing solution has a higher viscosity than the injected hydrocarbon fluid and this hydrocarbon fluid preferably has a higher viscosity than the aqueous solution containing acid. This viscosity relationship allows the fluoride-containing solution to efficiently displace the resident aqueous fluids from the pore space. It also reduces fluoride displacement by the aqueous solution containing acid. A suitable viscosifier for use in the aqueous fluoride-containing solution may include a salt of poly-2-acrylamido-2-methyl propyl sulfonate, or other polymeric sulfonate salt.

A sufficient amount of acid is preferably injected into the formation to react with all of the fluoride salts injected in the formation. It is particularly preferred to inject acid in a significant stoichiometric excess relative to the amount of the fluoride salts in the formation. High concentrations of acid are preferred so as to maximize the concentration of hydrofluoric acid formed at the acid front as it displaces the hydrocarbon bank and assure penetration into the formation of hydrochloric acid to the same radial extent to which the fluoride salt solution has been immobilized. Acid concentrations in excess of 2 molar are preferred.

Various additives such as corrosion inhibitors, demulsifying agents, surfactants, and viscosifiers, may be added to the aqueous fluid containing fluoride salts, to the hydrocarbon fluid and/or the acid solution. Suitable inhibitors include the inorganic arsenic compounds, acetylenic alcohols, thiophenols, quaternary ammonia compounds and similar organic agents. Almost any of the surfactants capable of reducing interfacial tension between oil and water may be used in this invention. The surface-active agents selected, of course, should be compatible with the injected hydrocarbon, the fluoride salts, and the acid solution. In the preferred case, they should be preferentially oil soluble and be placed in the injected hydrocarbon. Specific surface active materials which may be employed include, for example, ethylene glycol monobutyl ether and sorbitan monooleate.

In performing the matrix acidizing treatment in accordance with this invention, it is desirable to inject all fluids without fracturing the formation. The formation fracture pressure can be determined by conventional computation techniques employing known or estimated properties of the formation. This pressure limitation determines the rate at which the acid solution can be injected. Normally from 1 to 20 barrels of fluoride salt solution per foot of formation, internal to be treated is injected at a rate ranging between about 0.25 barrels to 5 barrels per minute.

Another embodiment of the present invention is to inject into the formation by means of a well an aqueous solution containing an acid preferably hydrochloric acid. This acid solution is then immobilized by injecting into the formation a liquid, preferably a hydrocarbon, which is substantially immiscible with the acid solution. An aqueous solution containing a fluoride salt, preferably an ammonium salt of hydrofluoric acid, is then injected into the formation. The fluoride salt will contact the acid to form hydrofluoric acid.

A further embodiment of this invention is to inject a liquid preflush into the formation prior to injection of the fluoride-containing solution. In this embodiment in acid solution is injected into the formation. This acid may be intended to react with calcite and other carbonate materials in the formation and thus alleviate undesirable dissipation of the hydrogen fluoride generated at a later stage of the process. In this case the acid solution is preferably hydrochloric acid. The acid solution may also be intended to break down the perforations in the casing and thereby establish good communication between the well bore and the siliceous formation. In this case the acid solution is preferably a mixture of hydrochloric and hydrochloric acids known as mud acid. This acid solution should then be followed with an aqueous solution, preferably an ammonium chloride solution, neutralized with ammonium hydroxide, or ammonium carbonate or ammonium bicarbonate. This aqueous solution serves to displace acid from the formation pore space to be treated so as to prevent premature activation of the fluoride ion containing solution of this invention which may limit its penetration into the formation.

In still another embodiment of this invention, the steps in carrying out this invention may be repeated at least once. For example, two or more cycles of the following steps may be carried out in the practice of this invention (a) injecting into the formation an aqueous solution containing fluoride salts, (b) injecting into the formation a hydrocarbon liquid, and (c) injecting into the formation an aqueous solution containing an acid.

LABORATORY TESTS

In order to demonstrate the effectiveness of this invention, laboratory tests were run comparing various embodiments of this invention with treatments typical of the prior state-of-the art. The tests will be referred herein as Tests A, B, C, D, E, F, and G. Tests A and B comprised alternately injecting solutions containing ammonium fluoride and hydrochloric acid. Tests C, D, and E comprised embodiments of the present invention. Test F comprised injecting common mud acid. Test G comprised injecting a solution of ammonium fluoride and methyl formate.

All the tests used sand samples consisting of sand from the bank of the Brazos River packed into rubber sleeves 48 inches long. In tests A, B, C, F, and G the sleeve was 1 inch in diameter and in tests D and E the sleeve was 1½ inch in diameter. The rubber sleeves were then encased in a steel cylinder and compressed with hydraulic fluid to maintain a dense pack during the test. The tests were conducted at a temperature of 150° F. After treatment, the sand packs were removed from the steel cylinders and the rubber sleeves were opened. The clay content was determined on the sand samples collected along the length of the sand pack. Clay content was determined by its cation exchange capacity from a methylene blue titration according to the method described in Bulletin API RP 13B entitled, "Standard Procedure for Testing Drilling Fluids", published in February, 1974 by the American Petroleum Institute.

The following describes the treatment steps on the sand samples for Tests A, B, C, D, E, F, and G. The hydrochloric acid solutions used in these tests typically contained a commercial corrosion inhibitor, Corexit 8503, sold by Exxon Chemical Company.

TEST A

The sand pack used for this test was 1-inch in diameter and 48-inches in length. The pore volume (PV) was 205 cubic centimeters (cc). During the acidizing test sequence, all fluids were pumped at a flow rate of 7cc per minute.
1. To prepare the sand sample for the test, calcium carbonate was removed from the sand by pumping:
   (a) 1.0 PV 8 wt% NaCl brine
   (b) 7.3 PV 3 wt% HCl
2. The acidizing test was conducted by pumping 6 cyles of treating chemicals. Each cycle consisted of:
   (a) 0.13 PV 5 wt% HCl with 0.1 volume percent Corexit 8503
   (b) 0.13 PV 0.8 molar $NH_4F$ in water (pH 8.5)
3. To prepare the sand for clay analysis, it was necessary to remove all resident fluid from the sand pack. This was accomplished by pumping:
   (a) 1.0 PV 5 wt% HCl with 0.1 vol% Corexit 8503
   (b) 0.5 PV ethylene glycol isopropyl ether
   (c) 1.20 PV pentane The sand pack was then blown dry with nitrogen

TEST B

This test was conducted in essentially the same manner as described for test A except that in step number two, 16 cycles of treating chemicals were used.

TEST C

The sand pack used for this test was 1-inch in diameter and 48-inches in length. The pore volume was 190cc. During the acidizing test sequence, all fluids were pumped at a flow rate of 7cc per minute.
  (a) 1.0 PV 8 wt% NaCl brine
  (b) 7.5 PV 3 wt% HCl
  (c) 0.25 PV 15 wt% HCl with 0.4 vol% Corexit 8503
  (d) 0.50 PV 4 wt% $NH_4Cl$ brine
2. The acidizing test was conducted by pumping:
  (a) 0.25 PV 6 molar $NH_4F$ in water (pH 8.5)
  (b) 0.25 PV diesel oil
  (c) 0.50 PV 30 wt% HCl with 0.6 vol% Corexit 8503
3. To prepare the sand for clay analysis, it was necessary to remove all resident fluid from the sand pack. This was accomplished by pumping:
  (a) 1.0 PV 1 wt% HCl
  (b) 0.5 PV ethylene glycol mono isopropyl ether
  (c) 1.2 PV pentane
The sand pack was then blown dry with nitrogen gas.

TEST D

The sand pack used for this test was 1½ inches in diameter and 48 inches in length. The pore volume was 435cc. During the acidizing test sequence, all fluids were pumped at a flow rate of 15cc per minute.
1. To prepare the sand for the test, calcium carbonate was removed from the sand by pumping:
  (a) 1.0 PV 8 wt% NaCl brine
  (b) 7.5 PV 3 wt% HCl plus 4 wt% $NH_4Cl$
  (c) 0.25 PV 15 wt% HCl with 0.5 vol% Corexit 8503
  (d) 1.5 PV 4 wt% $NH_4Cl$ brine
2. The acidizing test was conducted by pumping:
  (a) 0.25 PV 10 molar $NH_4F$ in water (pH 8.5)
  (b) 0.50 PV diesel oil
  (c) 0.50 PV diesel oil containing 15 vol% ethylene glycol monobutyl ether (a surface-active compound)
  (d) 1.25 PV diesel oil
  (e) 0.50 PV 30 wt% HCl with 0.6 vol% Corexit 8503
3. To prepare the sand for clay analysis, it was necessary to remove all of the resident fluid from the sand pack. This was accomplished by pumping:
  (a) 1.0 PV 1 wt% HCl
  (b) 0.50 PV isopropyl alcohol
  (c) 1.5 PV pentane
The sand pack was then blown dry with nitrogen gas.

TEST E

The sand pack used for this test was 1½ inches in diameter and 48 inches in length. The pore volume was 455cc. During the acidizing test sequence, all fluids were pumped at a flow rate of 15cc per minute.
1. To prepare the sand for the test, calcium carbonate was removed from the sand by pumping:
  (a) 1.0 PV 8 wt% NaCl brine
  (b) 7.5 PV 3 wt% HCl plus 4 wt% $NH_4Cl$
  (c) 0.25 PV 15 wt% HCl with 0.5 vol% Corexit 8503
  (d) 1.5 PV 4 wt% $NH_4Cl$ brine
2. The acidizing test was conducted by pumping:
  (a) 0.35 PV 10.3 molar $NH_4F$ in water (pH 8.5) containing 0.3 wt% poly 2-acrylamido-2-methyl propyl sulfonate (a viscosifier)
  (b) 0.50 PV diesel oil
  (c) 0.50 PV diesel oil containing 10 vol% ethylene glycol monobutyl ether (a surface-active compound) and containing 0.2 vol% sorbitan monooleate (a surface-active compound)
  (d) 0.50 PV diesel oil
  (e) 1.0 PV 30 wt% HCl with 0.6 vol% Corexit 8503
3. To prepare the sand for clay analysis, it was necessary to remove all of the resident fluid from the sand pack. This was accomplished by pumping:
  (a) 1.0 PV 1 wt% HCl
  (b) 0.50 PV isopropyl alcohol
  (c) 1.5 PV pentane
The sand pack was then blown dry with nitrogen gas.

TEST F

The sand pack used for this test was 1 inch in diameter and 48 inches in length. The pore volume was 200cc. During the acidizing test sequence, all fluids were pumped at a flow rate of 7cc per minute.
1. To prepare the sand for the test, calcium carbonate was removed from the sand by pumping:
  (a) 1.0 PV 8 wt% NaCl brine
  (b) 7.5 PV 3 wt% HCl
2. The acidizing test was conducted by pumping:
  (a) 1.0 PV 3 wt% HF plus 12 wt% HCl containing 0.5 vol% Corexit 8503
3. To prepare the sand for clay analysis it was necessary to remove all the resident fluid from the sand pack. This was accomplished by pumping:
  (a) 0.50 PV ethylene glycol mono isopropyl ether
  (b) 1.20 PV pentane
The sand pack was then blown dry with nitrogen gas.

TEST G

The sand pack used for this test was 1 inch in diameter and 48 inches in length. The pore volume was 170cc. During the acidizing test sequence, all fluids were pumped at a flow rate of 7cc per minute.
1. To prepare the sand for the test, calcium carbonate was removed from the sand by pumping:
  (a) 1.0 PV 8 wt% NaCl brine
  (b) 7.5 PV 3 wt% HCl plus 6 wt% NaCl
  (c) 1.1 PV 4 wt% $NH_4Cl$ plus 2 wt% $NH_4HCO_3$
  (d) 1.3 PV 4 wt% $NH_4Cl$ brine
2. The acidizing test was conducted by pumping:
  1.1 PV 1 molar $NH_4F$ plus 2 molar methyl formate in water
3. To prepare the sand for clay analysis, it was necessary to remove all resident fluid from the sand pack. This was accomplished by pumping:
  (a) 1.1 PV 4 wt% $NH_4Cl$ plus 2 wt% $NH_4HCO_3$
  (b) 0.5 PV ethylene glycol mono isopropyl ether
  (c) 1.20 PV pentane
The sand pack was then blown dry with nitrogen gas.

Figure 2:
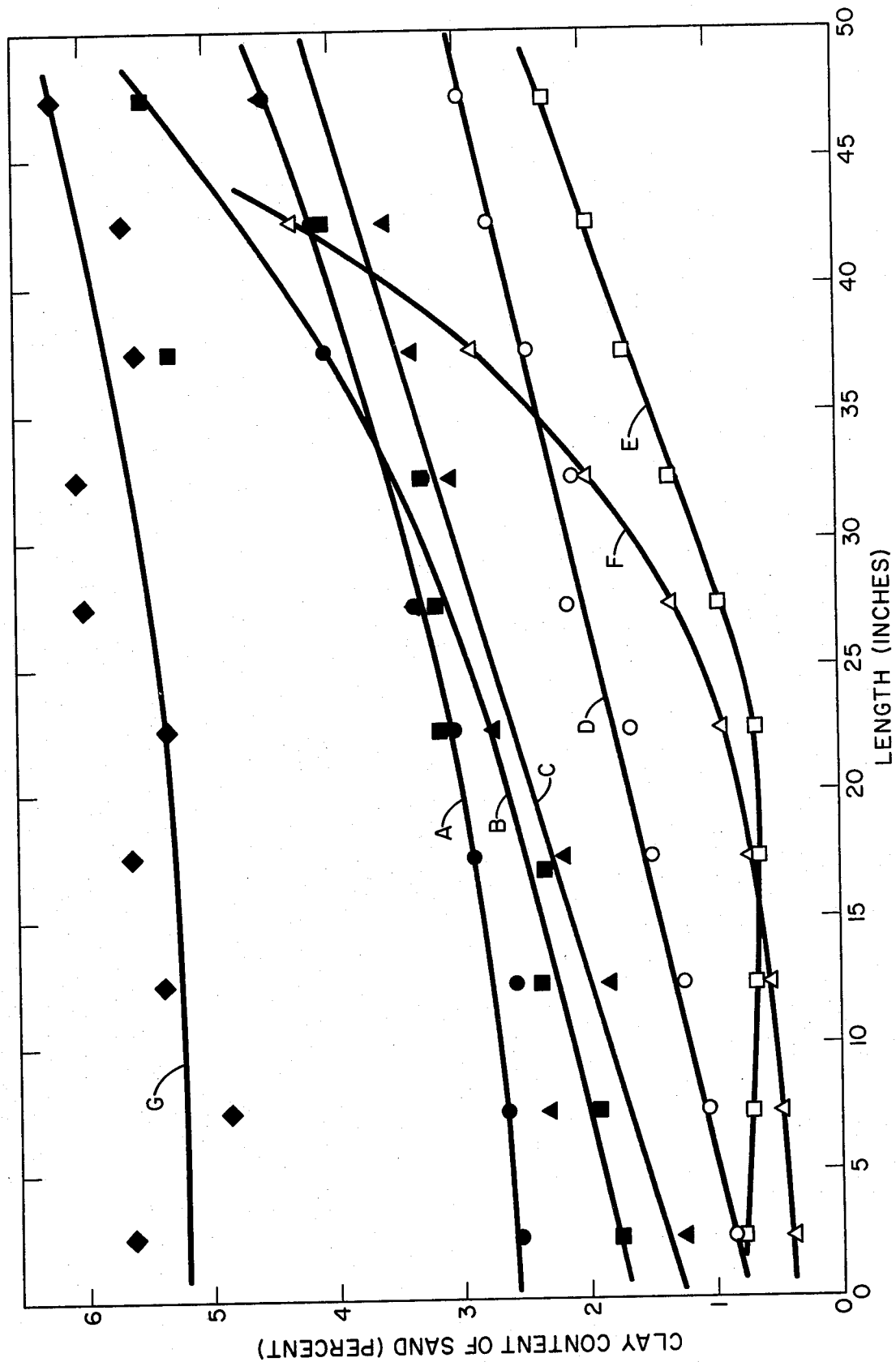
FIG. 2 is a graph of laboratory tests on several sand samples showing the relation between clay content in percent and distance in inches from the ends of the samples into which fluids were injected. The results illustrated in this FIGURE show the improvement of the present invention over several prior art processes.

Results of tests A, B, C, D, E, F, and G are set forth in FIG. 2 which shows the relation between the clay content in percent of the sand in the test samples and the distance in inches from the injection ends of the samples. The Brazos River sand used in these tests had an initial clay content of 6.0 to 6.5 weight percent. This clay had an ion exchange capacity of 0.58 milliequivalents per gram.

Curve F in FIG. 2 is typical of the results obtained when conventional mud acid (3 wt% HF, 12 wt% HCl) is used for clay removal. Near the injection face, the remaining clay content is less than one-half of one percent. The clay content rises slowly to 1% at 24 inches from the injection face, and then rises more rapidly approaching 6% clay at 48 inches from the injection face. Examination of the sand after the acid treatment revealed a large loss of silica within 2 to 3 inches of the injection face. It is this localized reaction zone that can break down the interface between the rock and the cement used to set the wellbore casing thereby forming a path for undesirable water or gas to reach the producing interval.

Curve G shows the results obtained with one prior art method for generating hydrofluoric acid in the formation pore spaces. A mixture of ammonium fluoride and methyl formate was injected into the pore space. The methyl formate hydrolyzed in the pore space to form formic acid which in the presence of ammonium fluoride generated hydrofluoric acid. As shown in FIG. 2, the amount of clay dissolved by this technique was small. Clay dissolution did occur fairly uniformly throughout the entire sand volume with no obvious silica dissolution at the injection face.

Curves A and B in FIG. 2 represent another prior art process to generate hydrofluoric acid in the pore space. In this method, alternate volumes of aqueous ammonium fluoride and hydrochloric acid are pumped through the sand. There is no attempt to immobilize the liquids containing fluoride or acid. The reported mechanism for hydrofluoric acid generation is the attachment of fluorine ions to the anion exchange sites of the clay minerals. Subsequent contact with hydrochloric acid generates hydrofluoric acid in the pore space. To achieve significant clay removal, it is recommended to use multiple cycles of the $NH_4F$-HCl injection sequence. Curve A is the result from injecting 6 cyles of treating fluids into a sand pack. About 50% of the clay in the sand pack was removed by this treatment.

Increasing the number of $NH_4F$-HCl cycles to 16 gives curve B in FIG. 2. Clay removal by this treatment was only slightly better than the 6 cycle case, even though almost 3 times as much fluoride ion was injected. Apparently, most of the fluoride ions are flowing through the sand without encountering hydrochloric acid or generating hydrofluoric acid.

Curve C in FIG. 2 is the result obtained by treating the sand with one of the embodiments of the current invention. The injection sequence consisted of an ammonium fluoride solution followed by diesel oil and finally a strong hydrochloric acid solution. This test shows this treatment sequence is an improvement over the prior art techniques discussed above. This improvement is attributed to the immobilization of the ammonium fluoride solution by the diesel oil. The diesel oil drives the fluoride solution to a saturation approaching residual water saturation leaving the sand pack substantially free of mobile aqueous liquid.

At residual water saturation, the aqueous fluoride solution primarily occupies the smaller pore spaces while diesel occupies the larger pore spaces. When hydrochloric acid is injected, it can readily displace diesel from the interior of the large pore spaces with only a small amount of fluoride displacement from the smaller pore spaces. Owing to diffusion and mixing, the coexistence of fluoride ion and hydrochloric acid in the pore space leads to the rapid generation of hydrofluorice acid.

As shown by Curve C, the clay removal capability of this treatment is better than any of the prior art techniques for generating hydrofluoric acid in the pore space. In addition, no apparent silica dissolution occured near the injection face using the treatment designed in accordance with this invention. This feature overcomes one of the primary drawbacks to conventional mud acid treatments.

Another embodiment of the current invention is to employ a surface active material in the diesel oil. The result of employing ethylene glycol monobutyl ether (EGMBE) as a surface active material in the diesel is shown as Curve D in FIG. 2. The ammonium fluoride solution was followed by diesel oil which drove the $NH_4F$ solution to a residual saturation of 37% by volume. Following this with diesel oil containing 15 volume percent EGMBE lowered the fluoride solution saturation to 30%. Injection of untreated diesel oil completed the fluoride immobilization sequence. With untreated diesel in the pore space, the aqueous phase becomes mobile when the aqueous saturation reaches or exceeds 37%. Since the fluoride solution saturation had been reduced to 30% by the diesel-EGMBE mixture, the fluoride solution is not mobilized by untreated diesel oil injected into the pore spaces.

Injecting hydrochloric acid into a sand prepared in the manner described for Test D results in less displacement of the fluoride containing solution and consequently greater clay removal than Curve C. Once again, silica dissolution at the injection face was avoided by the use of this invention.

As previously described, another emboidment of this invention is the use of an agent to increase the viscosity of the aqueous fluoride solution. The addition of 0.3 wt% of the potassium salt of poly-2-acrylamido-2-methyl propyl sulfonate (PAMPS) can increase the viscosity of a 10-molar $NH_4F$ solution from 3 centipoises to 5 centipoises. Curve E in FIG. 2 was generated in a manner similar to curve D except that 0.3 wt% PAMPS was included in the fluoride solution. The increased viscosity of the fluoride solution allowed it (1) to more efficiently displace the resident aqueous fluid from the sand, and (2) to resist being displaced itself by the aqueous hydrochloric acid solution.

Comparison of Curve E with the other clay removal data in FIG. 2 shows it to be clearly superior to other techniques for generating hydrofluoric acid in the pore spaces. In fact, the clay removal capability of this treatment approaches that for conventional mud acid over the first 18 inches of the sand and is superior to mud acid in the region beyond 18 inches. It is important to emphasize that unlike conventional mud acid, silica dissolution was not observed at the injection face with the current invention.

FIELD EXAMPLE

This example is provided to show how one embodiment of this invention may be practiced in a field application. The sandstone formation treated in this example is penetrated by a well. The formation has a porosity of 35 percent. The treatment for this well is designed to penetrate a 4-foot radius surrounding the well over any desired formation interval. The formation has a pore volume of 130 gallons per foot of the formation interval. If the formation contains carbonate minerals or it is desired to break down the perforations in the casing, a mixture containing 12 weight percent HCL and 3 weight percent HF acids may be injected as a preflush liquid. All fluid injection should be at a rate which maintains the injection pressure below the formation fracture pressure. After the preflush, if carried out, 50 gallons per foot of formation interval of an aqueous solution containing 4 weight percent $NH_4Cl$ is injected into the formation by means of the well. This amount of ammonium chloride is injected into the formation because generally about ½ pore volume is required to displace resident aqueous fluids from the zone to be treated. About 40 gallons of an aqueous solution containing 10.5 molar ammonium fluoride which contains 3000 parts per million potassium salt of poly 2-acrylamido-2-methyl propyl sulfonate (PAMPS) is injected into the formation per foot of formation interval. The amount of ammonium fluoride solution injected is slightly more than the actual residual volume for the formation being treated. The PAMPS is included in the ammonium fluoride solution to increase the solution viscosity to about 5 centipoises. After injection of the ammonium fluoride solution, 50 gallons of diesel oil with 10% by volume of ethylene glycol monobutyl ether (EGMBE) is injected into the formation per foot of interval. Thereafter, 50 gallons per foot of diesel oil without EGMBE is injected into the formation. After the diesel oil is injected, 100 gallons per foot of an aqueous solution containing 28 weight percent of HCl is injected into the formation. The well is then returned to production.

It should be apparent that the foregoing method of the present invention offers significant advantages over sandstone acidizing methods previously known in the art. It will be appreciated that while the present invention has been primarily described with regard to the foregoing embodiments, it should be understood that several variations and modifications may be made in the embodiments described herein without departing from the broad inventive concept disclosed herein.

We claim:

1. In a method for acidizing a subterranean siliceous formation surrounding a wellbore wherein at least two aqueous solutions are injected into the formation, one of the aqueous solutions containing a fluoride salt and the other aqueous solution containing an acid, the improvement comprising the steps of
   (a) injecting into the formation one of said aqueous solutions,
   (b) injecting into the formation a liquid that is substantially immiscible with said injected aqueous solution in an amount sufficient to substantially reduce the saturation of the injected aqueous solution in a substantial portion of the formation invaded by said aqueous solution in step (a); and
   (c) injecting into the formation the other aqueous solution, said acid in one of said aqueous solutions combining with fluoride salts in the other aqueous solution to form hydrofluoric acid which is capable of dissolving siliceous material.

2. The method as defined in claim 1 wherein the first injected solution contains fluoride salts and the second injected solution contains acid.

3. The method as defined in claim 2 wherein the fluoride salt is an ammonium salt of hydrofluoric acid.

4. The method as defined in claim 2 wherein the acid is hydrochloric acid.

5. The method as defined in claim 1 wherein the first injected aqueous solution contains acid and the second injected aqueous solution contains fluoride salts.

6. The method as defined in claim 1 wherein the liquid substantially immiscible with the first injected aqueous solution is a hydrocarbon.

7. The method as defined in claim 6 wherein the hydrocarbon is oil.

8. The method as defined in claim 1 wherein the first injected aqueous solution is more viscous than the second injected aqueous solution.

9. The method as defined in claim 1 wherein the liquid substantially immiscible with the first aqueous solution is less viscous than the first injected aqueous solution and is more viscous than the second injected aqueous solution.

10. The method as defined in claim 1 wherein the liquid substantially immiscible with the first injected aqueous solution contains at least one surface-active compound.

11. The method as defined in claim 10 wherein the surface active compound comprises ethylene glycol monobutyl ether.

12. The method as defined in claim 1 wherein the first injected aqueous solution contains at least one surface-active compound.

13. The method defined in claim 1 wherein the first injected aqueous solution contains a material to increase the solution viscosity.

14. The method as defined in claim 13 wherein the material to increase the solution viscosity comprises a polymeric sulfonate salt.

15. A method as in claim 14 wherein the material to increase the solution viscosity is a salt of poly-2-acrylamido-2-methyl propyl sulfonate.

16. The method as defined in claim 1 wherein the liquid substantially immiscible with the first injected aqueous solution comprises at least 5 percent by volume of the total volume of the first injected aqueous solution.

17. The method as defined in claim 1 further comprising injecting an aqueous solution as a preflush into the formation prior to injecting the first aqueous solution.

18. The method as defined in claim 17 wherein the aqueous preflush solution is substantially free of metal ions.

19. The method as defined in claim 1 wherein an aqueous acid solution substantially free of hydrofluoric acid and adapted to dissolve multivalent metal carbonates is flowed into the formation ahead of said first injected aqueous solution.

20. The method as defined in claim 1 wherein steps a, b, and c are repeated at least once.

21. The method as defined in claim 1 wherein the amount of said injected liquid that is substantially immiscible with said first injected aqueous solution is sufficient to reduce substantially all of said first injected solution to approximately residual fluid saturation.

22. The method as defined in claim 1 wherein the volume of said injected liquid that is substantially immiscible with said first injected aqueous solution is about the same as the volume of the first injected aqueous liquid.

23. The method as defined in claim 1 wherein the volume of said injected liquid that is substantially immiscible with said first injected aqueous solution is at least as large as the volume of the first injected aqueous liquid.

24. The method as defined in claim 1 wherein the volume of said injected liquid that is substantially immiscible with said first injected aqueous liquid ranges from about 1 barrel to about 20 barrels per foot of formation interval being treated.

25. In a method for acidizing a subterranean siliceous formation surrounding a wellbore wherein at least two aqueous solutions are injected into the formation, one of the aqueous solutions containing a fluoride salt and the other aqueous solution containing an acid, the improvement comprising the steps of
  (a) injecting into the formation one of said aqueous solutions;
  (b) injecting into said formation a hydrocarbon liquid which contains at least one surface-active material;
  (c) injecting into said formation a hydrocarbon liquid substantially free of surface-active material, the combined amounts of the hydrocarbon liquid containing surface-active material and the hydrocarbon liquid substantially free of surface-active material injected into said formation being sufficient to reduce the saturation of said injected aqueous solution in at least a portion of the formation invaded by said aqueous solution in step (a) to residual saturation; and
  (d) injecting into the formation the other aqueous solution, said acid in one of said aqueous solutions combining with fluoride salts in the other aqueous solution to form hydrofluoric acid which is capable of dissolving siliceous material.

26. A method for acidizing a subterranean siliceous formation surrounding a wellbore which comprises the steps of
  (a) injecting into said formation an aqueous solution containing fluoride salts;
  (b) injecting into the formation a hydrocarbon liquid which is substantially immiscible with the aqueous solution containing fluoride salts in an amount sufficient to reduce the saturation of the injected aqueous solution in a substantial portion of the formation invaded by said aqueous solution in step (a) to residual saturation; and
  (c) injecting into the formation an aqueous solution containing an acid which on contact with the fluoride salts will form hydrogen fluoride and thereby dissolve siliceous material.

27. The method as defined in claim 26 wherein the fluoride salt is an ammonium salt of hydrofluoric acid.

28. The method as defined in claim 26 wherein the hydrocarbon comprises diesel oil.

29. The method as defined in claim 26 wherein the acid solution comprises a solution of hydrochloric acid.

30. A method for improving the permeability of siliceous formation surrounding a wellbore which comprises:
  (a) injecting into the formation an aqueous liquid containing at least one water soluble fluoride salt;
  (b) injecting into the formation a hydrocarbon liquid which is substantially immiscible with the aqueous liquid and will immiscibly displace the aqueous liquid in the formation, the amount of said hydrocarbon liquid injected into the formation being sufficient to reduce the saturation of the injected aqueous solution to residual saturation; and
  (c) injecting into the formation an aqueous solution which on contact with the fluoride salt forms hydrogen fluoride.

31. A method for acidizing a subterranean siliceous formation surrounding a wellbore which comprises:
  (a) injecting into said formation an aqueous solution containing fluoride salts;
  (b) injecting into said formation a hydrocarbon liquid which contains at least one surface-active material;
  (c) injecting into said formation a hydrocarbon liquid substantially free of surface-active material, the combined amounts of the hydrocarbon liquid containing surface-active material and the hydrocarbon liquid substantially free of surface-active material being sufficient to reduce the saturation of the injected aqueous solution in at least a portion of the formation invaded by said aqueous solution to residual saturation; and
  (d) injecting into said formation an aqueous solution containing an acid which on contact with fluoride salts will form hydrogen fluoride and thereby dissolve siliceous material.

32. The method as defined in claim 31 wherein the fluoride salt is an ammonium salt of hydrofluoric acid.

33. The method as defined in claim 31 wherein the surface-active material comprises ethylene glycol monobutyl ether.

34. The method as defined in claim 31 wherein the ammonium fluoride solution contains a viscosifier.

35. The method as defined in claim 31 wherein the acid in the aqueous solution is hydrochloric acid.

36. A method for acidizing a subterranean siliceous formation surrounding a wellbore which comprises:
  (a) injecting into sand formation a solution of a fluoride salt;
  (b) injecting a liquid hydrocarbon into said formation to immiscibly displace said salt solution radially outwardly into the formation and to reduce the saturation of the salt solution in at least a portion of the invaded interval to residual saturation; and
  (c) injecting an acid solution into the formation, said acid solution combining with the fluoride salt solution to form hydrofluoric acid.

37. In a method for acidizing a subterranean siliceous formation surrounding a wellbore wherein at least two aqueous solutions are injected into the formation, one of the aqueous solutions containing a fluoride salt and the other aqueous solution containing an acid, the improvement comprising the steps of
  (a) injecting into the formation one of said aqueous solutions,
  (b) injecting into the formation a substantial volume of liquid that is substantially immiscible with said injected aqueous solution to reduce the saturation of the injected aqueous solution in a portion of the formation invaded by said aqueous solution in step (a) to approximately residual saturation.
  (c) injecting into the formation the other aqueous solution, said acid in one of said aqueous solutions combining with fluoride salts in the other aqueous solution to form hydrofluoric acid which is capable of dissolving siliceous material.

* * * * *